US005517019A

United States Patent [19]
Lopez

[11] Patent Number: 5,517,019
[45] Date of Patent: May 14, 1996

[54] OPTICAL COMPOUND EYE SENSOR WITH OMMATIDIUM SENSOR AND RELATED METHODS

[76] Inventor: Luis R. Lopez, 190 Green Valley Rd., Owens Cross Roads, Ala. 35763

[21] Appl. No.: 399,488

[22] Filed: Mar. 7, 1995

[51] Int. Cl.⁶ ..................................................... H01J 40/14
[52] U.S. Cl. ...................................... 250/208.1; 250/239
[58] Field of Search ............................. 250/203.1, 203.3, 250/203.4, 203.6, 206.1, 206.2, 208.1

[56] References Cited

U.S. PATENT DOCUMENTS

| | | |
|---|---|---|
| 2,844,728 | 7/1958 | Munday . |
| 3,448,276 | 6/1969 | Witte . |
| 3,751,664 | 8/1973 | Falbel . |
| 3,858,046 | 12/1974 | Cubalchini . |
| 3,899,672 | 8/1975 | Levi-Setti . |
| 4,238,675 | 12/1980 | Turlej et al. . |
| 4,479,056 | 10/1984 | Zierhut . |
| 4,657,397 | 4/1987 | Oehler et al. . |
| 5,006,712 | 4/1991 | Keller . |
| 5,015,844 | 5/1991 | Cole ............................. 250/227.24 |
| 5,022,725 | 6/1991 | Matsunami et al. . |
| 5,023,440 | 6/1991 | Kuppenheimer, Jr. ............ 250/203.6 |
| 5,124,918 | 6/1992 | Beer et al. . |
| 5,361,272 | 11/1994 | Gorelik . |

OTHER PUBLICATIONS

R. T. Schneider et al., "A Mechanical Model Of The Insect Eye," 1982 IEEE, pp. 178–181.

O. E. Holland et al., "Neural control of locomotion in a quadrupedal robot," IEEE Proceedings–F, vol. 139, No. 6, Dec. 1992, pp. 431–436.

J. F. Butler et al., "Signal Processing In The Insect Eye," 1982 IEEE, pp. 174–177.

Roy Walters, "Robotic Vision Using Spacial Optical Sampling," 1983 IEEE, pp. 115–118.

M. F. Land, "Compound eyes: old and new optical mechanisms," Nature, vol. 287, 23 Oct. 1980, pp. 681–686.

D. Cliff, "Evolving Visually Guided Robots," 2nd Int. Conf. on Simulation of Adaptive Behavior, Honolulu, HI 7–11 Dec. 1992, pp. 1–20.

Primary Examiner—Edward P. Westin
Assistant Examiner—Jacqueline M. Steady
Attorney, Agent, or Firm—Hopkins & Thomas; Scott A. Horstemeyer

[57] ABSTRACT

An optical compound eye sensor (100) comprises a plurality of ommatidium sensors (10) disposed in a fixed relationship to form a multifaceted sensing surface. Each of the ommatidium sensors (10) has a conical body (12) of refractive material situated longitudinally along a respective optic axis (14) and has a lens face (16) and an electro-optic element (18), such as an emitter or detector, situated at substantially opposing ends of the conical body (12) along the respective optic axis (14). The lens face (16) and the conical body (12) direct light either to or from the electro-optic element (18). The lens faces (16) of the ommatidium sensors (10) collectively define the multifaceted surface for receiving light from the light source.

26 Claims, 9 Drawing Sheets

OPTICAL COMPOUND EYE SENSOR WITH OMMATIDIUM SENSOR AND RELATED METHODS

FIELD OF THE INVENTION

The present invention generally relates to optics and light detection, and more particularly, to an optical compound eye sensor with ommatidium sensors and related methods for detecting distributions of light by apposition techniques.

BACKGROUND OF THE INVENTION

Researchers are embarking on a new frontier of biologically inspired machines. Development of a neuro-optical theory for practical robotic insect vision is taking shape. In this regard, some researchers are suggesting the use of optical compound eye sensors modeled after compound eyes found in insects. For example, see N. Franceschini et al., "From Insect Vision to Robot Vision," IEEE International Conference of Advanced Robotics (1991).

The compound eye in insects comprises a three dimensional multifaceted surface for receiving light. It is capable of sensing motion as well as rudimentary images. Making use of entomological terms, one facet is called an ommatidium, which literally means "little eye." Each ommatidium has a lens for receiving light therethrough, a crystalline cone connected to the lens, a group of photoreceptor cells near the vertex of the cone, and an adaptive pigment layer surrounding the cone. The adaptive pigment layer is dark during the daylight and is clear or translucent during the night. In essence, this layer adapts the eye to bright ambient light by optically isolating individual ommatidia. At low light levels, the layer becomes translucent allowing more light to travel throughout the system.

Evolution of compound eye vision has yielded five types of compound eye systems. See Nilsson D. E., "Vision Optics and Evolution," *Bioscience*, Vol. 39, No. 5, May, 1989. These five categories can be generalized into two classes based on how they physically gather and detect light: (1) neural superposition and (2) optical superposition. Further, a degenerative case of neural superposition is apposition. Moreover, optical superposition covers refracting, reflecting, and parabolic superposition eyes. Each eye type (1) and (2) uses a different light gathering strategy to separate or combine image information, while it is still in photonic form. The physical difference is that a neural superposition eye does not attempt to form an optical image by combining light from neighboring ommatidia. In contrast, each ommatidium in the optical superposition eye combines image forming light rays from neighboring ommatidia to form images or partial images. To summarize, the optical eye combines light into an optical image, whereas the neural superposition eye (including apposition eye) must process light inputs to form a neural image because there is no optical image formed.

While it has been recognized that artificial compound eyes would be advantageous in the robotics environment and elsewhere, there are no feasible systems and methods for inexpensively constructing reliable compound eyes or artificial ommatidia.

SUMMARY OF THE INVENTION

Briefly described, the present invention is an optical compound eye sensor for detecting distributions of light by apposition and an ommatidium sensor which is used to create the optical compound eye sensor by aggregating a plurality of the ommatidium sensors. The optical compound eye sensor and the ommatidium sensor are inexpensive to manufacture, reliable in operation, and adequately sensitive to detect light patterns and motion of a light source for a wide variety of inexpensive applications. It should be further emphasized that the optical compound eye sensor of the present invention can be utilized to detect one- and/or two-dimensional light patterns as well as one and/or two dimensions of light motion.

The optical compound eye sensor comprises a plurality of ommatidium sensors disposed in a fixed relationship, for example, by fixation to a mount or to each other. The ommatidium sensors collectively form a compound eye sensing means with a multifaceted surface, one-, two-, or three-dimensional if desired, for receiving light from a light source. The ommatidium sensors have a substantially conical body of refractive material or free space situated longitudinally along a respective optic axis. The sensors have a lens face and an electro-optic element situated near the cone focus of the conical body along the respective optic axis. The electro-optic element may be either a detector or an emitter. The lens face and the conical body direct light either to or from the detector or emitter, respectively. Light emitters may be located within ommatidium sensors situated in the optical compound eye sensor for the purpose of emitting light outwardly from the multifaceted surface and aiding in image detection. The lens faces of all of the ommatidium sensors collectively define the multifaceted surface for receiving light from the light source.

An important feature of the present invention is a mounting means for mounting the ommatidium sensors in a fixed relationship relative to each other in order to create the multifaceted surface for receiving light. In one embodiment, the ommatidium sensors are bonded together via a bonding agent. In another embodiment, the ommatidia are held in place by solder connections to a PC-Board. In another embodiment, a plurality of connection fin pairs are disposed externally on and protruding outwardly from the conical body of each ommatidium sensor. Each of the connection fin pairs comprises two substantially parallel blades for receiving therebetween in frictional and electrical engagement a blade of an adjacent ommatidium sensor. In yet another embodiment, the mounting means comprises a mounting surface which may have be nonplanar for providing a three dimensional multifaceted surface, for example, a hemispherical or spheroidal configuration. Preferably, the mounting surface comprises a plurality of apertures, one of which is dedicated to and supports each ommatidium sensor. Each ommatidium sensor is affixed to an aperture via frictional, snap-in, or threaded engagement of the conical body and the aperture.

Another feature of the present invention is that the optical compound eye sensor can be easily interfaced with a coaxial cable, fiber optic cable, or other electro-optic interface mechanism.

Another feature of the present invention is that the conical body of each ommatidium sensor is produced from an inexpensive resin, plastic, air, free space, or other suitable material, resulting in a substantially solid, rigid, durable, reliable, and easily manipulated modular device. In other words, the ommatidium sensors fabricated in accordance with the present invention are modular in nature and can be configured to create virtually any three dimensional detection surface. Also, because the ommatidium sensors are produced from an inexpensive material, they can be used for a wide variety of inexpensive applications, including for example in toys.

Other features and advantages of the present invention will become apparent to one of skill in the art upon examination of the following drawings and detailed description.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

In accordance with the present invention, an optical compound eye sensor 100 (FIG. 14, for example) is fabricated from a plurality of novel ommatidium sensors 10 (FIG. 1) for detecting distributions of light by apposition. Apposition refers to a process whereby all incident light energy gathered by a particular ommatidium sensor is directed to its own detector or set of detectors located therein. The ommatidium sensors 10 can be aggregated and disposed in a fixed relationship with one another to form a one-, two-, or three-dimensional compound eye sensing means with a multifaceted surface for receiving light.

I. Ommatidium Sensor

Figure 1:
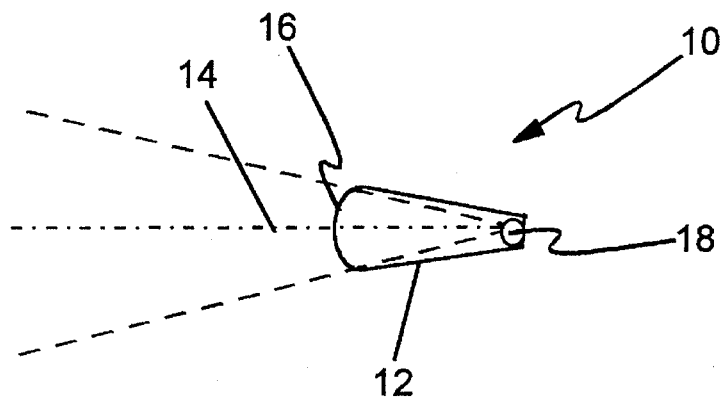
FIG. 1 is a side schematic view of a conical ommatidium sensor showing an optic axis and the position of a detector or emitter therein.

Referring now to the drawings wherein like reference numerals designate corresponding parts throughout the several views, FIG. 1 shows the ommatidium sensor 10 in accordance with the present invention. The ommatidium sensor 10 comprises a conical body 12, preferably fabricated from a solid refractive material, situated about an optic axis 14 and having a lens face 16 at one end opposing an electro-optic element 18, such as any conventional detector or emitter, at the other end. Hence, when a detector 18 is employed, the ommatidium sensor 10 receives energy, whereas when an emitter element 18 is employed, the ommatidium sensor 10 propagates energy outward. When an emitter element 18 is disposed within a sensor 10 of a larger optical compound eye sensor 100, the emitter 10 serves as a scene illuminator, analogous to a flashlight, for neighboring detector elements 18. It should be noted that the detailed geometry of the sensor 10 is dependent on the actual function to be accomplished. The basic geometrical parameters can be computed or derived with the intent of creating a specific optical angle of acceptance function required by a particular eye design.

A primary function of the ommatidium sensor 10 is to collect and guide light rays to or from the embedded electro-optic element 18 within a specific angle of acceptance function. Rays outside the angle of acceptance function are not detected or emitted by the ommatidium sensor 10. The angle of an incident ray is defined relative to the optic axis 14 and the position of the electro-optic element 18, as illustrated in FIG. 1. The ommatidium sensor 10 is fabricated from optical quality materials and can function in a wide range of light wavelengths.

Figure 2:
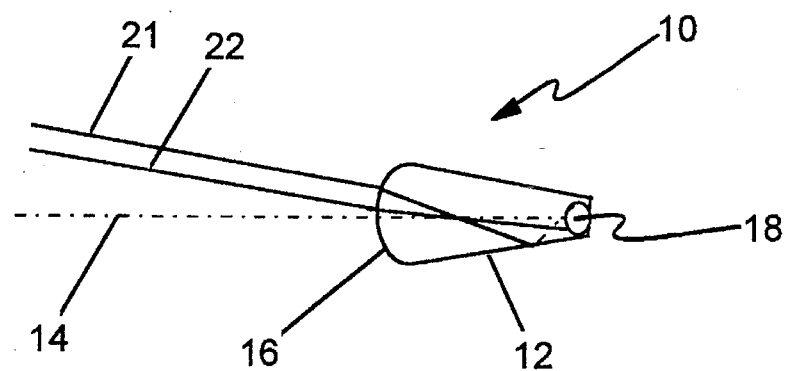
FIG. 2 is a side schematic view of the ommatidium sensor of FIG. 1 Showing typical ray paths.

As shown in FIG. 2, light rays 21, 22 enter the sensor 10 through the lens face 16, pass through the conical body 12, and are either generated or received at the electro-optic element 18. A primary function of the sensor 10 is to concentrate light entering through the lens face 16 or to expand light passing outwardly from the lens face 16. The angle of acceptance function determines the strength with which a given ray reaches or is emitted by the electro-optic element 18. FIG. 2 shows typical ray paths 21, 22.

Figures 3A, 3B:
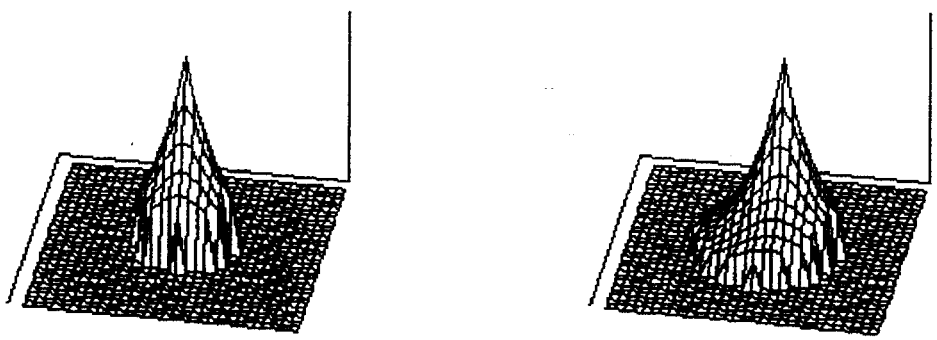
FIG. 3A is a three dimensional graph illustrating a symmetric angle of acceptance function corresponding to the ommatidium sensor of FIG. 5A.
FIG. 3B is a three dimensional graph of an asymmetric angle of acceptance function corresponding to the ommatidium sensor of FIG. 5A.

The angle of acceptance function can be rotationally symmetric or asymmetric about the optical axis 14. This concept is illustrated in FIGS. 3A and 3B, respectively. Intentional asymmetries in the electro-optic element 18 and placement of the electro-optic element 18 within the conical body 12 can result in an asymmetric angle of acceptance function with respect to the individual sensor 10 itself as well as an overall compound eye sensor 100 (FIG. 14) containing the individual sensor 10, as will be further described hereinafter. Asymmetric functions have a characteristic sensitivity to polarization, thereby making them very useful in developing polarization sensitive compound eyes. In FIGS. 3A and 3B, the peak acceptance is centered on the optical axis 14.

Figure 4:
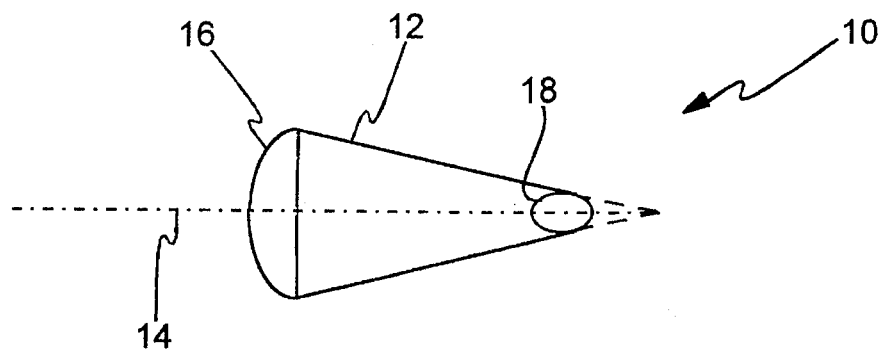
FIG. 4 is a cut-away side view of the ommatidium sensor of FIG. 1 showing the fundamental geometric parameters.

The angle of acceptance function is designed by determination of the optical geometry in the placement of the electro-optic element 18. A range of angle of acceptance functions can be achieved by examining the simple geometry shown in FIG. 4. Referring to FIG. 4, the four variables D, L, R and θ are the effective design parameters for a specific ommatidium sensor geometry, given that the system is rotationally symmetric about the optic axis 14. Distance D is the displacement of the electro-optic element 18 from the focus, or the tip of the conical body 12. Distance L is the length of the conical body 12, which guides light to and from the electro-optic element 18. Distance R is the radius of curvature of the lens face 16. θ is the half angle of the conical body 12. The parameters D, R, L, θ can be considered independent design parameters as long as the geometry is constrained by the following equation:

$$R \geq L \cdot \tan\theta \text{ for } 0 < \theta < \frac{\pi}{2} \quad (1)$$

The optical performance, i.e., the angle of acceptance function, is a function of the dimensionless ratios $\rho = R/L$ and $\delta = D/L$ and the cone half angle θ. These variables completely specify a given geometry for the ommatidium sensor 10.

The physical dimensions of the ommatidium sensor 10 is dictated only by the physical diameter D of the electro-optic element 18. Further, all other physical dimensions can be derived from the physical diameter d, given the dimensionless optical performance parameters $\rho = R/L$ and $\delta = D/L$, and θ. Furthermore, equations for the physical dimensions of the sensor geometry using an electro-optic element 18 of physical diameter d, are given by the following equations.

$$D = \frac{d}{\tan\theta}, \quad (2)$$

$$L = \frac{D}{\delta} = \frac{d}{\delta \tan\theta}, \quad (3)$$

$$R = \rho L = \frac{\rho d}{\delta \tan\theta} \geq L \tan\theta. \quad (4)$$

The above design geometry need not be completely rotationally symmetric about the optic axis 14. An elliptical version of this geometry is possible. In the elliptical version, the conical body 12 is elliptically symmetric about the optic axis 14. This variation of geometry is uncommon in two dimensional sensors, but has applications in one dimensional compound eye systems.

Figure 5A:
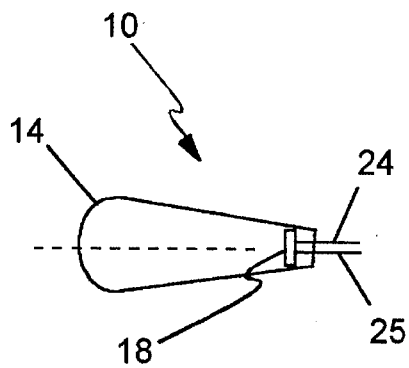
FIG. 5A is a side view of the ommatidium sensor of FIG. 1 showing placement of a detector therein for symmetric viewing.
Figure 5B:
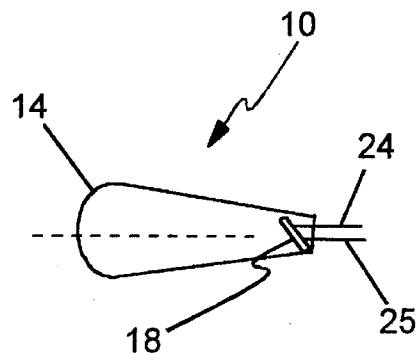
FIG. 5B is a side view of the ommatidium sensor of FIG. 1 showing placement of a detector therein for asymmetric viewing.

In this embodiment, the ommatidium sensor 10 is a single solid piece of optical material having the electro-optic element 18 embedded within or glued thereto, the electro-optic element 18 can be easily positioned to provide intentionally asymmetric input/output radiation patterns. Placement of the electro-optic element 18 for symmetric viewing is illustrated in FIG. 5A, whereas placement of the electro-optic element 18 for asymmetric viewing is illustrated in FIG. 5B. As shown in FIG. 5A, the electro-optic element 18 having interconnects 24, 25 is positioned so that its planar surface, which receives or emits radiation, is substantially perpendicular to the optic axis 14. Each electro-optic element 18 generally has two or more electrical connections, for example: signal output, power, ground, bias, etc. In FIG. 5B, with respect to asymmetric viewing, the electro-optic element 18 is slightly skewed, or angled, so that the surface which receives or emits radiation is not at a right angle to the optic axis 14.

It should be further noted that an optic fiber could be positioned at the end of the sensor 10 so as to function as a detection element by carrying optical signals to a set of remote photon sensors (not shown). Further, clusters of optical fibers could be embedded into the base of the sensor 10 to allow retrieval of a crude image from the sensor 10. In a free-space design each ommatidium is made from a hollow conical element 12 with the detector element placed at 18 of FIG. 4.

Figure 6:
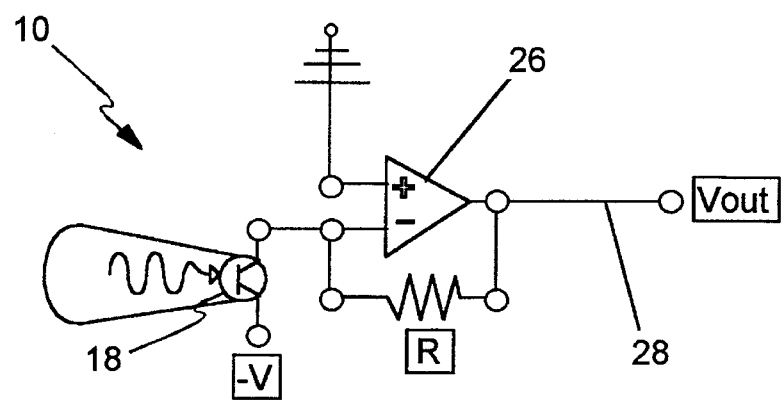
FIG. 6 is a circuit diagram of an amplification circuit which incorporates the ommatidium sensor of FIG. 1 as a phototransistor or photodiode in photoconductive operation.
Figure 7:
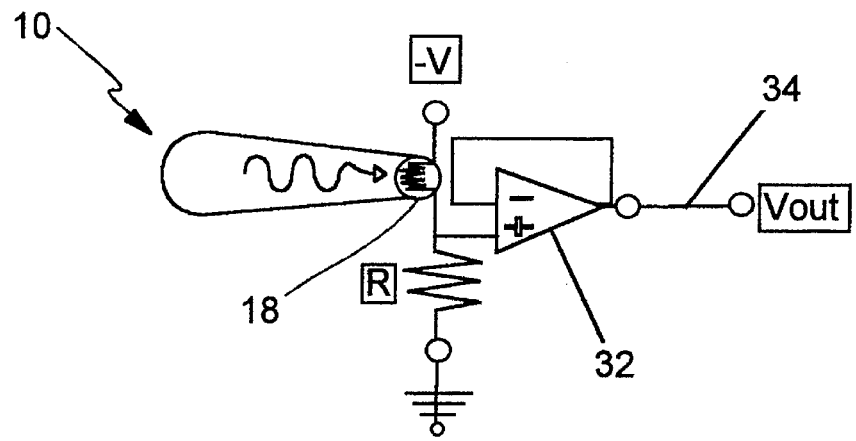
FIG. 7 is a circuit diagram of an amplification circuit which incorporates the ommatidium sensor of FIG. 1 as a photoresistor.

By way of example, FIGS. 6 and 7 illustrate circuit diagrams for amplification circuits for taking signals from or sending signals to the electro-optic element 18 and converting these signals to voltages. In FIG. 6, the electro-optic element 18 of the sensor 10 is utilized as a photoelectric transistor. The photocurrent generated from the element 18 passes through an amplifier 26, for example, an operational amplifier (opamp), having a biasing resistor R in order to provide a voltage output $V_{out}$ 28. The foregoing circuitry can be located internal or external to the sensor 10. Optionally, a biasing lead (not shown) from the element 18 can allow dynamic adjustment of the sensitivity of the element 18.

In FIG. 7, the electro-optic element 18 is utilized as a variable resistor which is varied via photodetection. In essence, a resistance divider amplification circuit is shown in FIG. 7, having an amplifier 32 and biasing resistor R for providing a voltage output $V_{out}$ 34. As with the embodiment of FIG. 6, the amplification circuit of FIG. 7 can be located external or internal to the sensor 10.

Figure 8:
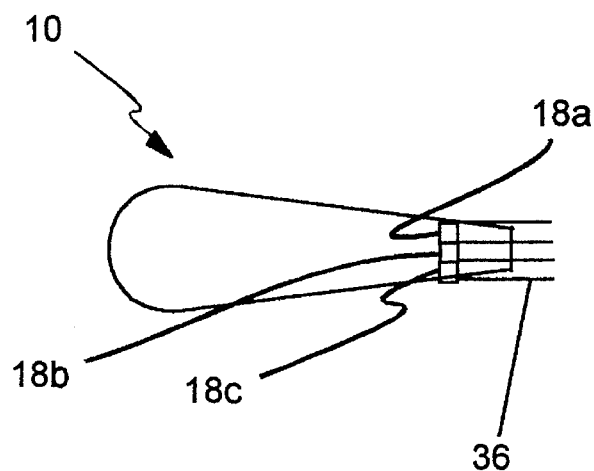
FIG. 8 is a side schematic view of the ommatidium sensor of FIG. 1 having a plurality of detectors for detecting colors.

Detection of colors is also possible using the ommatidium sensor 10. Herein, color detection need not necessarily be in the visible color spectrum. In accordance with the present invention, as illustrated in FIG. 8, color detection is accomplished by placing an array of color detection elements 18a, 18b, 18c at the position where the electro-optic element 18 has been shown in previous figures. Preferably, these elements 18a, 18b, 18c are placed substantially contiguous and in a substantially singular plane perpendicular to the optic axis 14. Furthermore, a common lead, which is connected to the ground or reference connection of each element 18a, 18b, 18c, may be provided in order to minimize the number of requisite electrical connections at the end of the sensor 10.

Figure 9:
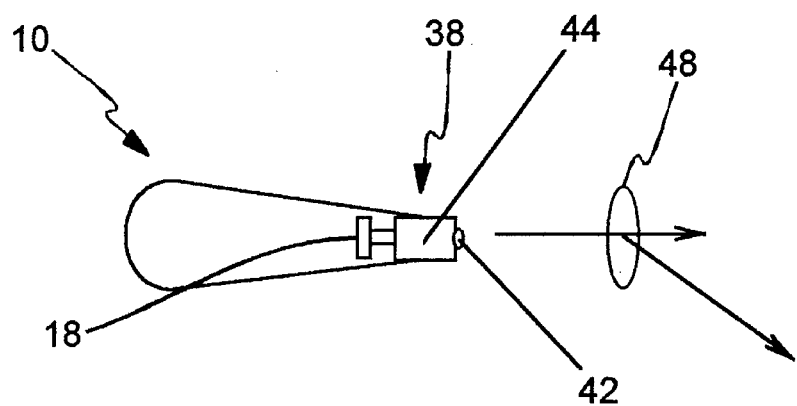
FIG. 9 is a side schematic view of the ommatidium sensor of FIG. 1 illustrating a configuration for optical transduction and encoding of ommatidial outputs from the detector.

To avoid complexities associated with electrical wiring for each ommatidium sensor 10 in the optical compound eye sensor 100 (FIG. 14), an embedded optical transducer 38, as shown in FIG. 9, may be employed. In this embodiment, a detector 18 drives an optical laser diode or light emitting diode, 42, preferably after amplification by an amplifier in order to encode the output of the detector element 18 in an optical manner. As indicated by reference arrows in FIG. 9, free space or fiber optic transmission carries the information to a subsequent processing layer. The foregoing methodology is also desirable if the subsequent processing layer is implemented by an optical processor. Optionally, a holographic, or spatial light modulator scheme, can be used to fix, or dynamically control where the encoded light is transferred. The beam steering element may also be embedded in or mounted on the ommatidium sensor 10.

Figure 10:
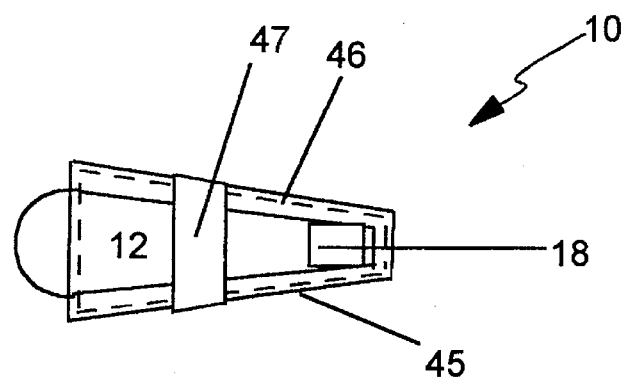
FIG. 10 is a partially cut-away side view of the ommatidium sensor of FIG. 1 showing an outer layer having an exterior absorptive coating (preferably black) and an interior reflective coating.
Figure 11:
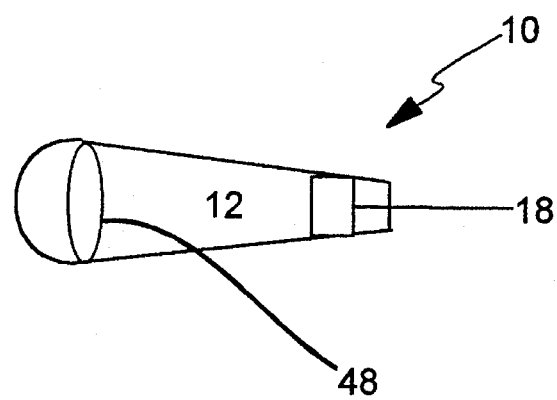
FIG. 11 is a side schematic view of the ommatidium sensor of FIG. 1 showing an embedded electro-optic element for filtering and/or controlling light passing through the conical body of the ommatidium sensor.

As illustrated in FIG. 10, each ommatidium sensor 10 may be coated with an exterior absorptive coating 45 in order to maximize internal reflectivity and minimize stray light penetrating the conical body 12. Also, an interior reflective coating 46 may be disposed on the interior of the sensor 10 for enhancing internal reflectivity and for optimally directing light through the body 12. It should also be noted that the body 12 may be produced from an optical resin, plastic, or other suitable material which has been dyed so as to filter unwanted wavelengths or colors of light.

Another feature of the present invention, as further illustrated in FIG. 10, is a conductive ring 47 disposed on the outside of the exterior absorptive coating 45. The conductive ring 47, made of any conductor material, is preferably applied anywhere along the body 12 via a coating process. The conductive ring 47 simplifies electrical connections. It may be interfaced to the ground, common, or reference lead of the electro-optic element 18. Moreover, when the sensor 10 is aggregated with other like sensors 10 in order to form a compound eye sensor 100, the rings 47 may be connected by direct engagement, by engagement with a bonding agent, such as solder, by interconnect wires or the like, by contact with a mounting bracket, or by any other suitable connecting apparatus. With this configuration, less electrical connections are necessary at the primary interface to the optical compound eye sensor 100.

The ommatidium sensor 10 may also have an embedded, intermediate electro-optic element 48 for controlling the quantity of specific light wavelengths entering the sensor 10. The intermediate element 48 may function as a light valve or light modulator. A commercially available liquid crystal device (LCD) could be used as the intermediate electro-optic element 48 to act as a dynamic light modulator or color/polarization filter. Such a configuration would allow a compound eye sensor 100 for adaptively controlling the spatial light distribution entering the compound eye sensor 100. This feature is very useful in calibrating and compensating for high contrast light inputs. Electro-optic elements 48 situated in a plurality of sensors 10 within a compound eye sensor 100 could function as an adaptive light shutter, similar to a camera iris or pupil, to thereby aid in adaptively adjusting the compound eye sensor 100 to ambient light changes.

II. Manufacture of an Ommatidium Sensor

The ommatidium sensor 10 of the present invention is manufactured as follows. The material utilized for molding the sensor body 12 is an optical quality polyresin which is mixed with a catalyst for promoting solidification and which cures over a period of time. It should be noted that the methodology described hereafter can be applied to molten and heat treated plastics. The polyresin is of variable viscosity. Viscosity ranges from light oil to thick honey work well in the present invention. Both optically clear and colored resins are also useable. Pigments added to the resins allow tailoring of the chromatic properties of the optics. Different polyresins can be chosen for refractic index in a given wavelength, such as in the visible or near infrared wavelengths.

Figure 12:
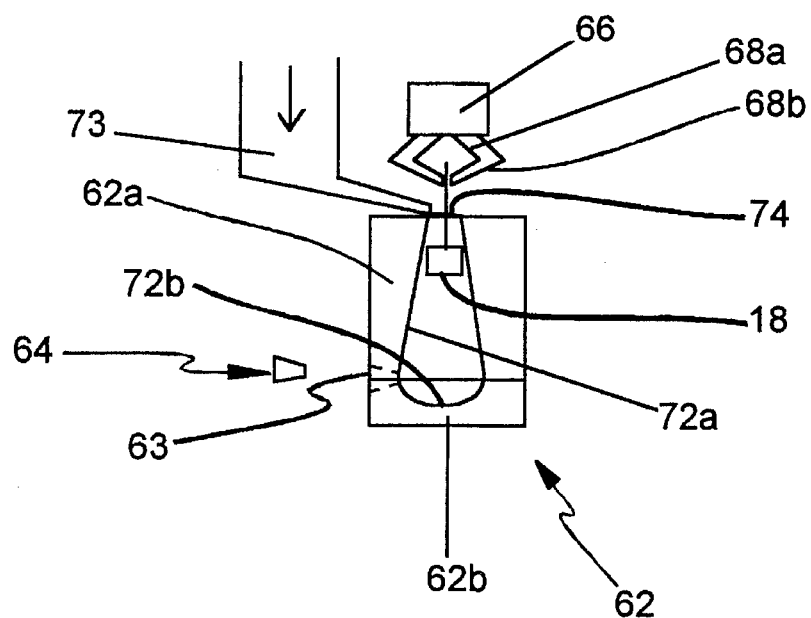
FIG. 12 is a side schematic view showing a single phase molding process for producing the ommatidium sensor of FIG. 1.

Molds can be manufactured by first cutting a die with the desired geometrical dimensions described previously in regard to FIG. 4. The die can then be used to cast a reusable mold or array of molds. Alternatively, molds can be machined from acceptable materials. In the preferred embodiment, a mold 62 having two pieces 62a, 62b, as illustrated in FIG. 12, is utilized for producing the sensor 10. The mold piece 62a is for molding the conical body 12, whereas the mold piece 62b is for molding a mold cap which comprises the lens face 16. Essentially, there are two methods for creating the sensor 10 using the mold 62: a single phase flow method and a two phase flow method.

In the single phase flow method, the mold pieces 62a and 62b are placed together as shown in FIG. 12. A clamping mechanism 66 having clamping arms 68a, 68b is utilized to suspend the electro-optic element 18 within a body cavity 72a of mold piece 62a. After the electro-optic element 18 has been suspended in the body cavity 72a, liquid polyresin is poured or injected into the top orifice 74 of the mold piece 62a from a polyresin dispenser 73 in order to fill the body cavity 72a and the cap cavity 72b. Excess polyresin exits the mold 62 via outlet 63, which can be capped with stopper 64 after completely filling the mold 62.

Figure 13A:
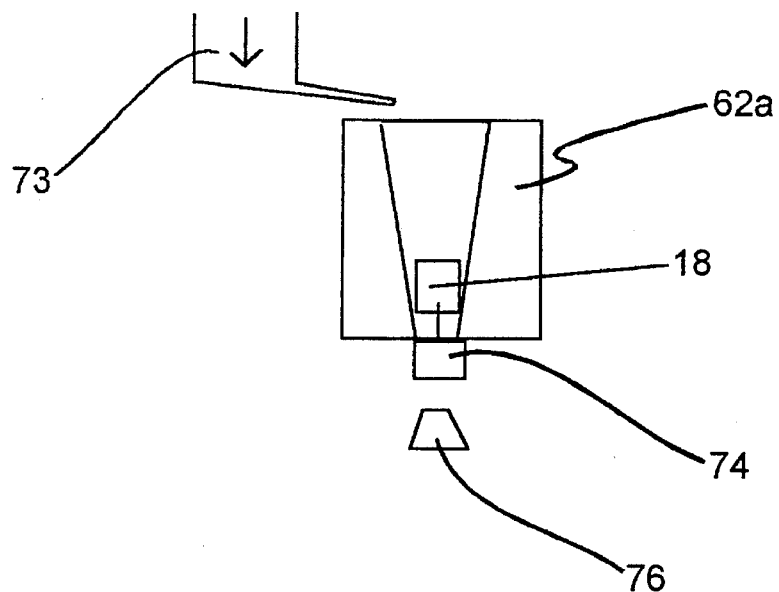
FIG. 13A is a side schematic view showing a first step in a two-phase molding process for producing the ommatidium sensor of FIG. 1.
Figure 13B:
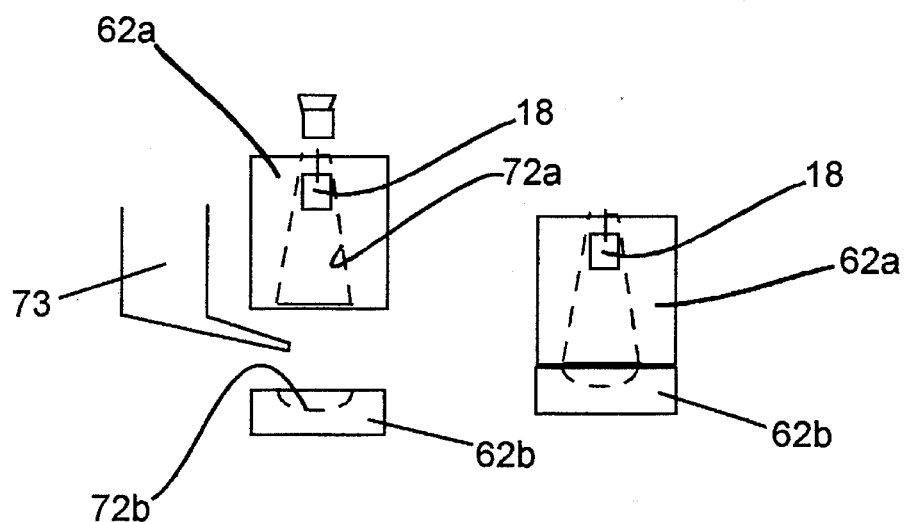
FIG. 13B is a side schematic view showing a second step in the two-phase molding process corresponding to FIG. 15A.

In the two phase flow method, which is illustrated in FIGS. 13A and 13B, the two piece mold 62 is utilized with polyresins which harden by heat or are cured with a catalyst. The two phase flow method is ideal for producing compound eye sensor hobby kits. The first phase of this method is illustrated in FIG. 13A. In the first phase, the electro-optic element 18 is positioned in the mold piece 62a and held in place by gravity and friction. Next, liquid polyresin is poured from the polyresin dispenser 73 into the mold piece 62a and the polyresin is permitted to gel or solidify. Excess polyresin leaves the mold piece 62a via the orifice 74, and a stopper 76 is utilized to plug the orifice 74 upon completion of the filling process.

In the second phase, liquid polyresin is poured into the cap cavity 72b of mold piece 62b. Next, the mold pieces 62a, 62b are put together in mating engagement so as to align the cap cavity 72b with the body cavity 72a. In this manner, the conical body 12 with lens face 16 is fabricated.

III. Optical Compound Eye Sensor

Figure 14:
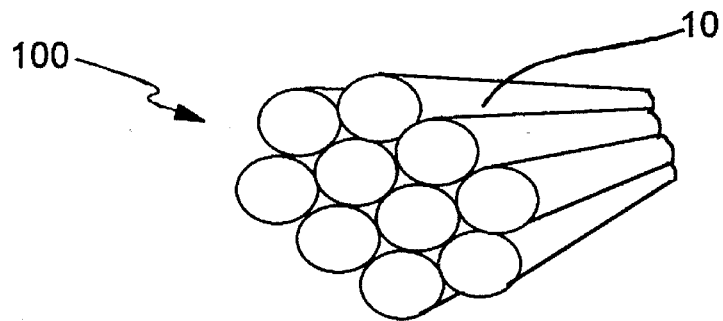
FIG. 14 is a perspective view of an optical compound eye sensor fabricated from a plurality of ommatidium sensors of FIG. 1 in accordance with the present invention.

As illustrated in FIG. 14, a compound eye sensor 100 is fabricated by aggregating the ommatidium sensors 10 as described previously. The compound eye sensors 100 may be aggregated to form any one, two, or three dimensional surface. Some of the mechanical and conductivity schemes developed for assembling the sensors 10 are described hereafter. In general, compound eye sensors 100 fabricated in accordance with the present invention can vary in detection surface shape, detection surface size, number of ommatidium sensors 10, type of ommatidium sensors 10, and distribution of ommatidial angles of acceptance. Actual array geometry and ommatidium sensor geometries must be specified on a functional basis. A design for any compound eye application requires some analysis of what the compound eye sensor 100 is supposed to accomplish and how sensitive the sensor 100 is to be. Most useful eye shapes and ommatidium sensor geometries can be implemented using the methods described in this section and the previous sections.

Figure 15:
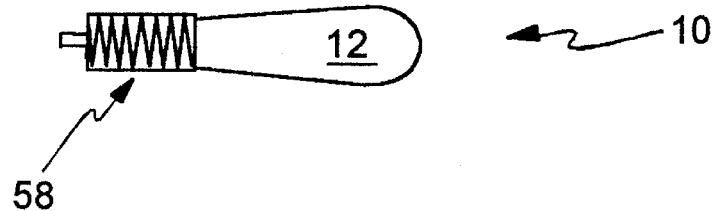
FIG. 15 is a side view of a threaded base for the ommatidium sensor of FIG. 1 used for connecting a coaxial cable or for mounting the sensor to a surface.

The ommatidium sensors 10 can be bonded by epoxy, rubber cement, or another adhesive to create a compound eye sensor 100, as illustrated in FIG. 14. The ommatidium sensors 10 may be interfaced to a standard ribbing cable for carrying electrical and/or optical information. Connections in this arrangement can also be made by using the conductive rings 47, shown in FIG. 10, if desired, as well as coaxial connectors. In the coaxial connector configuration, as shown in FIG. 15, each ommatidium sensor 10 is equipped with a threaded base 58, which is conductive or nonconductive, for receiving a threaded coaxial connector (not shown) in mating engagement.

Figure 16A:
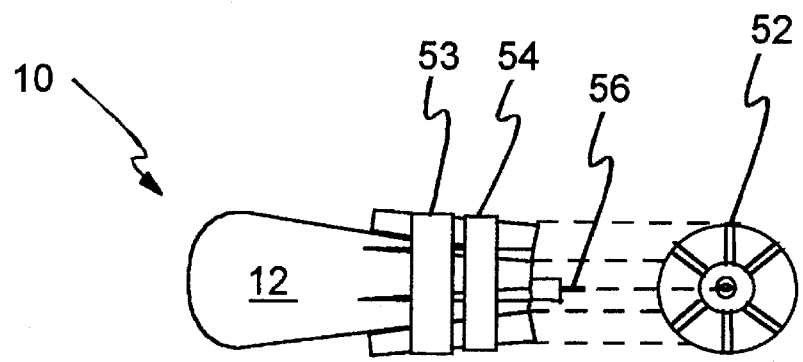
FIG. 16A is a side view of a connection fin system for affixing adjacent ommatidium sensors of FIG. 1.
Figure 16B:
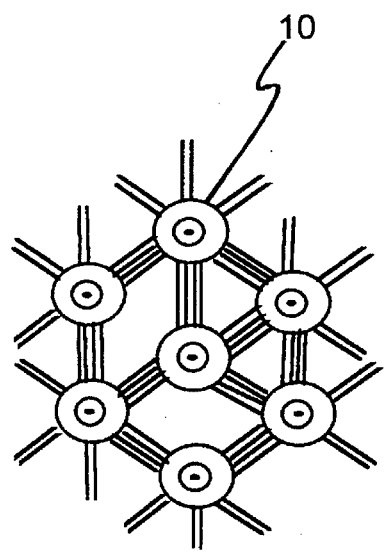
FIG. 16B is a bottom view of a plurality of ommatidium sensors which are connected in accordance with the connection fin system of FIG. 12A.

Another embodiment for mounting the sensors 10 in a fixed relationship so as to form the optical compound eye sensor 100 is shown in FIGS. 16A and 16B. These figures illustrate ommatidium sensors 10 having a plurality of connection fin pairs 52 disposed externally on and protruding outwardly from the periphery of conical body 12. Each of the connection fin pairs 52 has two substantially parallel blades for receiving therebetween in frictional engagement a blade of an adjacent ommatidium sensor 10.

In the preferred embodiment, a hexagonal fin pattern (six fin spaced 60° apart) is utilized for creating three dimensional sensing surfaces, i.e., a compound eye sensor 100 which can sense two dimensional patterns and two dimensions of motion. Further, in an embodiment of a compound eye sensor 100 requiring detection of only one dimension, only two fins spaced 180° apart are required on each sensor 10.

In addition, the connection fin pairs 52 may be electrically coupled by one or more conductive rings 53, 54 (preferably two), as shown in FIG. 16A in order to minimize the number of requisite electrical connections at the point of interface. In this configuration, two separate reference leads, which are common to all sensors 10 in a grouping, may be interconnected via one of the rings 53, 54. Also, as shown in FIGS. 16A and 16B, a single or multiconductor cable 56, for example, a fiber optic axial connector, may be interfaced to the electro-optic element 18.

Figure 17:
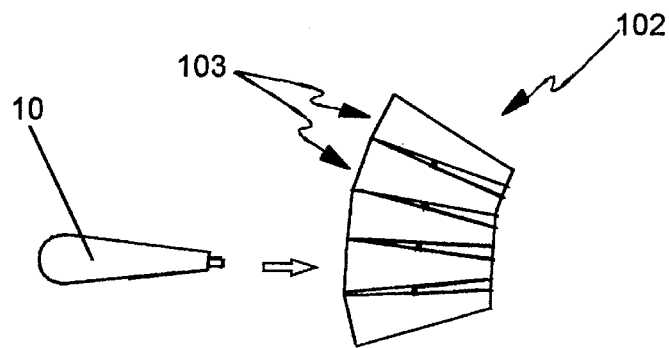
FIG. 17 shows a side schematic view of a one-dimensional honeycomb mount for mounting a plurality of the ommatidium sensors of FIG. 1.

The ommatidium sensors 10 may also be disposed in a fixed relationship by utilizing a lightweight honeycomb structure 102, preferably fabricated from plastic, as shown in FIG. 17. The honeycomb structure 102 has a plurality of honeycomb cavities 103 for holding sensors 10 in respective cavities 103 by frictional engagement, mating engagement ("snap in" correlative members), using a bonding agent, or some other suitable means. The honeycomb structure 102 can be produced in a one- or two-dimensional array for creating virtually any compound eye surface. If desired, the honeycomb structure 102 can carry an internal electrical contact ring (not shown) for interfacing with a conductive ring 47 (FIG. 10).

Figure 18:
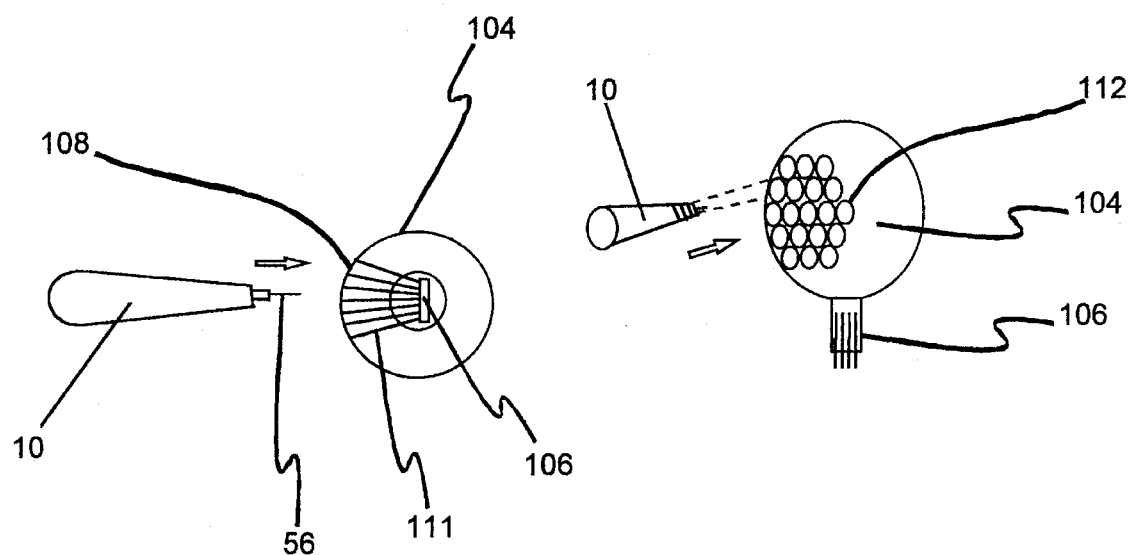
FIG. 18 is a perspective schematic view of a spheroidal connection mount with coaxial lead connectors for receiving ommatidium sensors of FIG. 1 in frictional engagement therewith.

The ommatidial sensors 10 may also be mounted on a mounting surface which is curved or planar. For instance, as shown in FIG. 18, a spheroidal mounting surface 104 having support 106 is utilized to support a plurality of sensors 10. The surface 104 is covered with coaxial lead connectors 108. Much like an electronic breadboard, the connections are made by inserting the leads 56 into the coaxial lead connectors 108 on the surface 104. Within the body or inner cavity of the surface 104, the leads 56 from the sensors 10 are preferably connected to standard arrays of ribbon cables.

Figure 19:
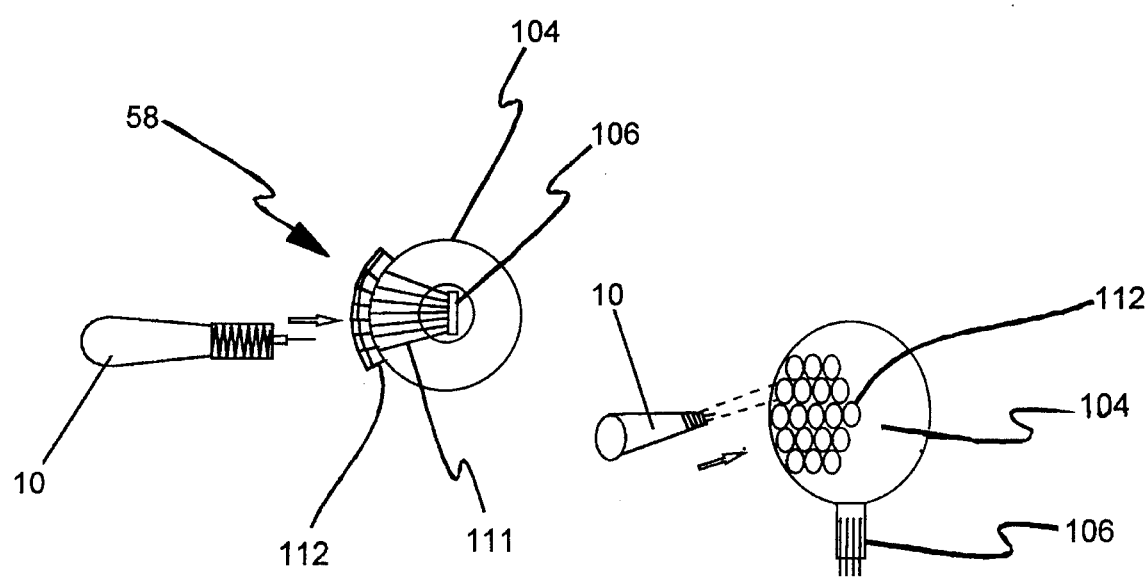
FIG. 19 is a perspective schematic view of a spheroidal connection mount with threaded coaxial lead connectors for receiving threaded ommatidium sensors of FIG. 1.

In yet another embodiment for connecting the sensors 10 to the surface 104, threaded coaxial connectors 112 are disposed over the surface 104, as shown in FIG. 19. Thus, the ommatidium sensors 10 having a threaded base 58 (FIG. 15) are screwed into appropriate locations on the surface 104.

Figure 20:
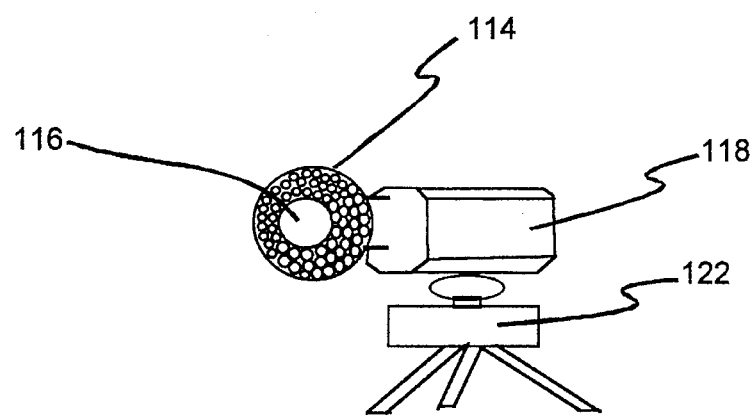
FIG. 20 is a perspective schematic view of a hemispherical mount for ommatidium sensors of FIG. 1 used for steering applications.

In addition to spheroidal mounting surfaces 104, other curved, and flat, mounting surfaces are possible, such as a hemispherical mounting surface or a ring-like mounting surface 114, as shown in FIG. 20 or a small flat PC board. With reference to FIG. 20, the ring-like mounting surface 114 may be disposed on a video camera lens 116 of a camera 118. The camera 118 is moved and positioned at any location in three dimensional space via an azimuth/elevation servo mechanism 122. With the foregoing configuration, the camera 118 with lens 116 is dynamically controlled and pointed in a direction determined by light sensed from the ring-like optical compound eye sensor 100 surrounding the camera lens 116.

IV. Support Circuitry for Optical Compound Eye Sensor

Figure 21:
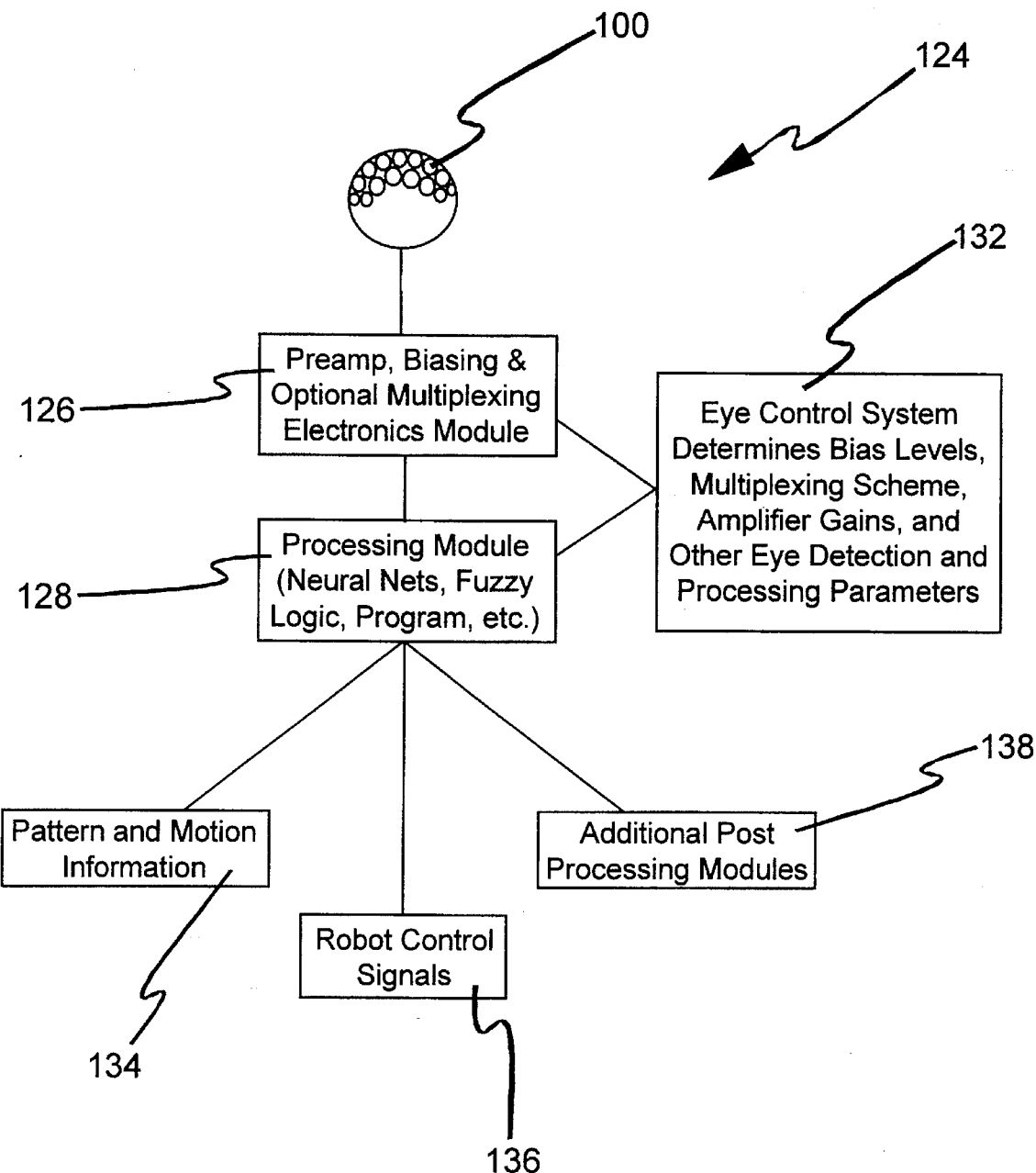
FIG. 21 is a circuit diagram of possible support circuitry for the optical compound eye sensor of FIG. 14.

The support circuitry for the optical compound eye sensor 100 can take various configurations. An example of one such configuration is illustrated in FIG. 21, and generally denoted by reference numeral 124. As shown in FIG. 21, the compound eye sensor 100 is connected to a module 126 which is configured to provide preamplifier functionality, biasing, and multiplexing, if desired. A processing module 128 is connected to and communicates with the module 126. The processing module 128 may include, for example, a neural network, fuzzy logic, a logic network, a processor having a program of executable instructions, etc.

The processing module 128 transforms the light data received by the sensor 100 into usable data. An eye control system 132 communicates with the modules 126, 128. The eye control system 132 determines bias levels, the multiplexing scheme, amplifier gains, and other eye detection and processing parameters. A pattern and motion information module 134 can be connected to the processing module 128 for determining patterns and motion. A robot control signal module 136 may be connected to the processing module 128 for generating control signals for a robot, if desired. Finally, one or more other modules 138 may be connected to the processing module 128 for performing additional postprocessing on the light data retrieved by the compound eye sensor 100. It should further be noted that the support circuitry shown in FIG. 21 may be implemented in hardware, software, or a combination thereof.

It will be obvious to those skilled in the art that many modifications may be made to the preferred embodiments described hereinbefore without substantially departing from the principles of the present invention. All such modifications are intended to be included herein within the scope of the present invention, as set forth in the following claims.

Wherefore, the inventor claims the following:

1. An optical compound eye sensor for detecting distributions of light by apposition, comprising:

a plurality of ommatidium sensors disposed in a fixed relationship to form a compound eye sensing means with a multifaceted surface for receiving light; and each of said ommatidium sensors having a substantially conical body of refractive material, or free space, situated longitudinally along a respective optic axis and having a lens face and a light detector situated at substantially opposing ends of said conical body along said respective optic axis, said lens faces and said conical body for directing light to said light detector, said lens faces of each of said ommatidium sensors for collectively defining said multifaceted surface.

2. The optical compound eye sensor of claim 1, wherein said multifaceted surface resides in a single plane.

3. The optical compound eye sensor of claim 1, wherein said multifaceted surface is three dimensional.

4. The optical compound eye sensor of claim 1, further comprising a light emitter located in an ommatidium sensor of said plurality for emitting light outwardly from said ommatidium sensor.

5. The optical compound eye sensor of claim 1, wherein said conical body comprises a reflective material situated about said respective optic axis for directing light inwardly.

6. The optical compound eye sensor of claim 1, wherein said conical body is substantially rigid.

7. The optical compound eye sensor of claim 1, wherein said compound eye sensing means exhibits an asymmetric angle of light acceptance.

8. The optical compound eye sensor of claim 1, wherein said compound eye sensing means exhibits a symmetric angle of light acceptance.

9. The optical compound eye sensor of claim 1, wherein said light detector of at least one of said ommatidium sensors comprises a photo diode.

10. The optical compound eye sensor of claim 1, wherein said light detector of at least one of said ommatidium sensors comprises a variable resistance.

11. The optical compound eye sensor of claim 1, further comprising a means for optically encoding signals from said detector of at least one of said ommatidium sensors.

12. The optical compound eye sensor of claim 1, further comprising a bonding agent for affixing said ommatidium sensors together.

13. The optical compound eye sensor of claim 1, wherein said body of each of said ommatidium sensors further comprises connection fins disposed externally on and protruding outwardly from said body, said connection fins for affixing adjacent ommatidium sensors together.

14. The optical compound eye sensor of claim 1, wherein said body of each of said ommatidium sensors further comprises a threaded connection means for affixing said body to a mounting means.

15. The optical compound eye sensor of claim 1, wherein said conical body includes a lateral external surface, and further comprising a conductive ring disposed on the lateral external surface of said conical body of each said ommatidium sensor and electrically connected to said light detector of each said ommatidium sensor.

16. The optical compound eye sensor of claim 5, further comprising a coating situated on said conical body on said reflective material, said coating for inhibiting penetration of light toward said optic axis.

17. An ommatidium sensor for creating an optical compound eye sensor which can detect a distribution of light by apposition, comprising:

a substantially conical body of refractive material, or free space, having a wide end and a narrow end;

a lens face situated at said wide end;

a light detector at said narrow end, said light detector for receiving light passing through said lens faces and said conical body; and mounting means for mounting said body in a fixed relationship relative to an adjacent body of an adjacent ommatidium sensor;

whereby a plurality of said ommatidium sensors are supported in a fixed relationship so that said lens faces of said ommatidium sensors collectively define a multifaceted surface for receiving light.

18. The sensor of claim 17, wherein said mounting means comprises a plurality of connection fin pairs disposed externally on and protruding outwardly from said body, each of said pairs comprising two substantially parallel blades for receiving therebetween in frictional engagement a blade of an adjacent ommatidium sensor.

19. The sensor of claim 17, wherein said mounting means comprises a threaded connector for affixing said body to a mount.

20. The sensor of claim 17, further comprising a conductive ring disposed on the lateral external surface of said body and electrically connected to said detector.

21. The sensor of claim 17, further comprising a means for interfacing said detector to a coaxial cable.

22. The sensor of claim 17, further comprising a means for interfacing said detector to a fiber optic cable.

23. The sensor of claim 17, further comprising a light modulator situated in said body between said lens faces and said detector.

24. A method for creating an optical compound eye sensor which can detect a distribution of light by apposition, comprising the steps of:

providing a plurality of ommatidium sensors, each having a substantially conical body of refractive material with a lens face situated at a wide end and with a light detector situated at a narrow end; and mounting said ommatidium sensors in a fixed relationship relative to each other so that said lens faces of said ommatidium sensors collectively define a multifaceted surface for receiving light.

25. An ommatidium sensor for creating an optical compound eye sensor which can detect a distribution of light by apposition, said sensor having a substantially conical body of refractive material, or free space, situated along an optic axis and having a lens face and a light detector situated at substantially opposing ends of said conical body along said optic axis, said detector mounted at an angle with respect to said optic axis, whereby a plurality of said ommatidium sensors are supported in a fixed relationship so that said lens face of said ommatidium sensors collectively define a multifaceted surface for receiving light.

26. An optical compound eye sensor comprising a plurality of ommatidium sensors, each ommatidium sensor having a substantially conical body of refractive material, or free space, situated along an optic axis and having a lens face and the light detector situated at substantially opposing ends of said conical body along said optic axis, said detector mounted at an angle with respect to said optic axis so as to produce an asymmetric angle of acceptance function about said optic axis, said sensors held together in a fixed relationship so as to provide a polarization sensitive compound eye.

* * * * *